US009129397B2

(12) United States Patent
Choi et al.

(10) Patent No.: US 9,129,397 B2
(45) Date of Patent: Sep. 8, 2015

(54) HUMAN TRACKING METHOD AND APPARATUS USING COLOR HISTOGRAM

(75) Inventors: Jin-Woo Choi, Daejeon (KR); So Hee Park, Daejeon (KR); Jong-Gook Ko, Daejeon (KR); Jang-Hee Yoo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 457 days.

(21) Appl. No.: 13/601,860

(22) Filed: Aug. 31, 2012

(65) Prior Publication Data

US 2013/0188827 A1  Jul. 25, 2013

(30) Foreign Application Priority Data

Jan. 19, 2012 (KR) .................. 10-2012-0006393

(51) Int. Cl.
*G06K 9/62* (2006.01)
*G06T 7/20* (2006.01)

(52) U.S. Cl.
CPC .............. *G06T 7/2033* (2013.01); *G06T 7/208* (2013.01); *G06T 2207/10016* (2013.01); *G06T 2207/10024* (2013.01); *G06T 2207/20076* (2013.01); *G06T 2207/30196* (2013.01); *G06T 2207/30232* (2013.01)

(58) Field of Classification Search
CPC ....................................... G06K 9/62
USPC ....................................... 382/103
See application file for complete search history.

(56) References Cited

U.S. PATENT DOCUMENTS

| 2003/0194131 | A1* | 10/2003 | Zhao et al. | 382/190 |
| 2006/0098865 | A1* | 5/2006 | Yang et al. | 382/159 |
| 2010/0296697 | A1* | 11/2010 | Ikenoue | 382/103 |

FOREIGN PATENT DOCUMENTS

| JP | 2009-87090 A | 4/2009 |
| KR | 10-0886323 B1 | 3/2009 |
| KR | 10-2010-0026500 A | 3/2010 |

OTHER PUBLICATIONS

An adaptive color-based particle filter. Katja Nummiaroa, Esther Koller-Meierb, Luc Van Goola. 2002.*
Katja Nummiaro et al., "An adaptive color-based particle filter", Image and Vision Computing 21, 2003, pp. 99-110, Elsevier.

* cited by examiner

*Primary Examiner* — Stephen R Koziol
*Assistant Examiner* — Delomia Gilliard

(57) ABSTRACT

A human tracking method using a color histogram is disclosed. The human tracking method using the color histogram according to the present invention can more adaptively perform human tracking using different target color histograms according to the human poses, instead of applying only one target color histogram to the tracking process of one person, such that the accuracy of human tracking can be increased. The human tracking method includes performing color space conversion of input video data; calculating a state equation of a particle based on the color-space conversion data; calculating the state equation, and calculating human pose-adaptive observation likelihood; resampling the particle using the observation likelihood, and estimating a state value of the human; and updating a target color histogram.

6 Claims, 3 Drawing Sheets

HUMAN TRACKING METHOD AND APPARATUS USING COLOR HISTOGRAM

CROSS-REFERENCE TO RELATED APPLICATIONS

The present application claims priority to Korean patent application number 10-2012-0006393, filed on Jan. 19, 2012, which is incorporated by reference in its entirety.

BACKGROUND OF THE INVENTION

The present invention relates to a human tracking method using a color histogram, and more particularly to a human tracking method using a color histogram, which can track a human being using different target color histograms according to poses of the human being when tracking the human being on the basis of a particle filter.

A monitoring system (also called a surveillance system) for sensing whether a certain specific behavior or accident occurs has been considered to be the most important technique from among various technical fields based on human tracking. With increasing development of modern society, the importance of safety of individuals and facilities is becoming higher not only in public spaces but also in personal spaces.

Particularly, as information technology, unmanned technology, automation, and computerization of modern society are rapidly increasing, unexpected problems continuously occur in security, safety and property of each person and business place.

Therefore, many efforts have been made to protect/manage property and safety of each person and business place, and the importance and range of security have been extended to major facilities, public offices, schools, enterprises, and homes, such that the importance of the monitoring system and the necessity of developing the same are rapidly increasing.

In the case of the conventional monitoring system using a closed circuit television (CCTV), a user who serves as an administrator of the security control center must simultaneously observe a plurality of images with the naked eye, such that the monitoring system has many disadvantages in terms of cost or efficiency due to physical and mental limitations of each person. In order to overcome the above-mentioned disadvantages, the monitoring system has been designed to track the position of one person or the positions of unspecified persons within an image sequence captured by a camera through the human tracking technology based on computer vision technology.

A tracking technology based on color information of an image is used as a representative example of the above-mentioned tracking technology. When a specific object contained in the image moves from one position to another position, the above-mentioned image-color based tracking technology discriminates the position of the object contained in the image through color information of the object, such that it can be applied to a variety of application fields, for example, factory automation, robotics, broadcasting, unmanned monitoring systems, security systems, remote conferencing through communication networks, unmanned aerial vehicle control, etc. In addition, considering that a person obtains a large amount of information visually, many more application fields will be realized in the future.

Generally, the object tracking technology receives an image as an input, and minimizes a difference in characteristic value between a target object and an observation model using any one of template matching, gradient descent, and mean shifting, such that it can estimate the object position to be obtained in a next frame using the minimized difference.

However, according to the above-mentioned tracking technology, provided that an object is temporarily covered with other objects or obstacles on the condition that the movement speed of a person is very high or the person moves in irregular directions, the tracking performance or throughput of the above-mentioned tracking technology is rapidly deteriorated. In order to overcome the above-mentioned problems, a multiple-hypotheses-based tracking method has recently been proposed, which diffuses a plurality of particles in the vicinity of an object on the basis of a stochastic model, measures a characteristic value of an observation model at every particle position, and tracks an object using the measured characteristic value.

Through observation of the characteristic values of multiple particles, the multiple-hypotheses-based tracking method establishes a variety of movable positions of the object to be shifted to the next frame according to a variety of hypotheses, and tracks the object, such that it can obtain an accurate tracking result even in the case of temporary overlapping or rapid movement.

The related art of the present invention is disclosed in Korean Patent Registration No. 10-0886323 issued on 4 Mar. 2009, entitled "METHOD AND APPARATUS FOR REAL-TIME-TRACKING OBJECT USING COLOR HISTOGRAM".

The human tracking method using the particle filter according to the present invention has robustness against temporary overlapping or covering, complicated background, rapid movement speed, irregular movement direction, etc. In addition, the tracking method using a color histogram as observation characteristic information of the particle filter has robustness against has robustness against illumination variation, and can track a low-resolution object having a small number of characteristic points (features) at a relatively high accuracy.

However, the tracking method based on color histogram information fails to track a target object under the condition that another object having distribution similar to that of the color histogram of the target object appears in the vicinity of the target object, and there may arise a large difference in human color histogram according to individual poses of the human being, such that the accuracy of tracking is deteriorated when human tracking is achieved using a single color histogram.

SUMMARY OF THE INVENTION

Various embodiments of the present invention are directed to providing a human tracking method using a color histogram that substantially obviates one or more problems due to limitations or disadvantages of the related art. Embodiments of the present invention provide a human tracking method based on a color histogram, which adaptively uses different target color histograms according to individual poses (i.e., front pose, backside pose, left-side pose, and right-side pose) of a human being when tracking the human being on the basis of a particle filter, such that it can track the human being successfully.

In accordance with an embodiment, a human tracking method using a color histogram includes: performing color space conversion of input video data; calculating a state equation of particles based on the color-space conversion data; calculating human pose-adaptive observation likelihood;

resampling the particles based on the observation likelihood, and estimating a state value of the human; and updating a target color histogram.

The state equation may include state variables which include a position of a human and a rotation angle of the human whose rotation axis is perpendicular to the ground.

The observation likelihood may be obtained using different target color histograms according to the human poses.

The estimating the state value of the human may include calculating the state value using a mean value of the resampled particles.

In accordance with other embodiment, a human tracking apparatus using a color histogram includes: an image input unit configured to receive input video data; a color space converter configured to perform color space conversion of the input video data; a state equation calculator configured to calculate a state equation of particles based on the color-space conversion data; an observation likelihood calculator configured to calculate human pose-adaptive observation likelihood; a particle resampler configured to resample the particles based on the observation likelihood; and a state value estimator configured to estimate a state value of the human based on the resampled particles.

The state equation may include state variables which include a position of a human and a rotation angle of the human whose rotation axis is perpendicular to the ground.

The observation likelihood may be obtained using different target color histograms according to the human poses.

The state value of the human may be estimated using a mean value of the resampled particles.

DESCRIPTION OF SPECIFIC EMBODIMENTS

Figure 1:
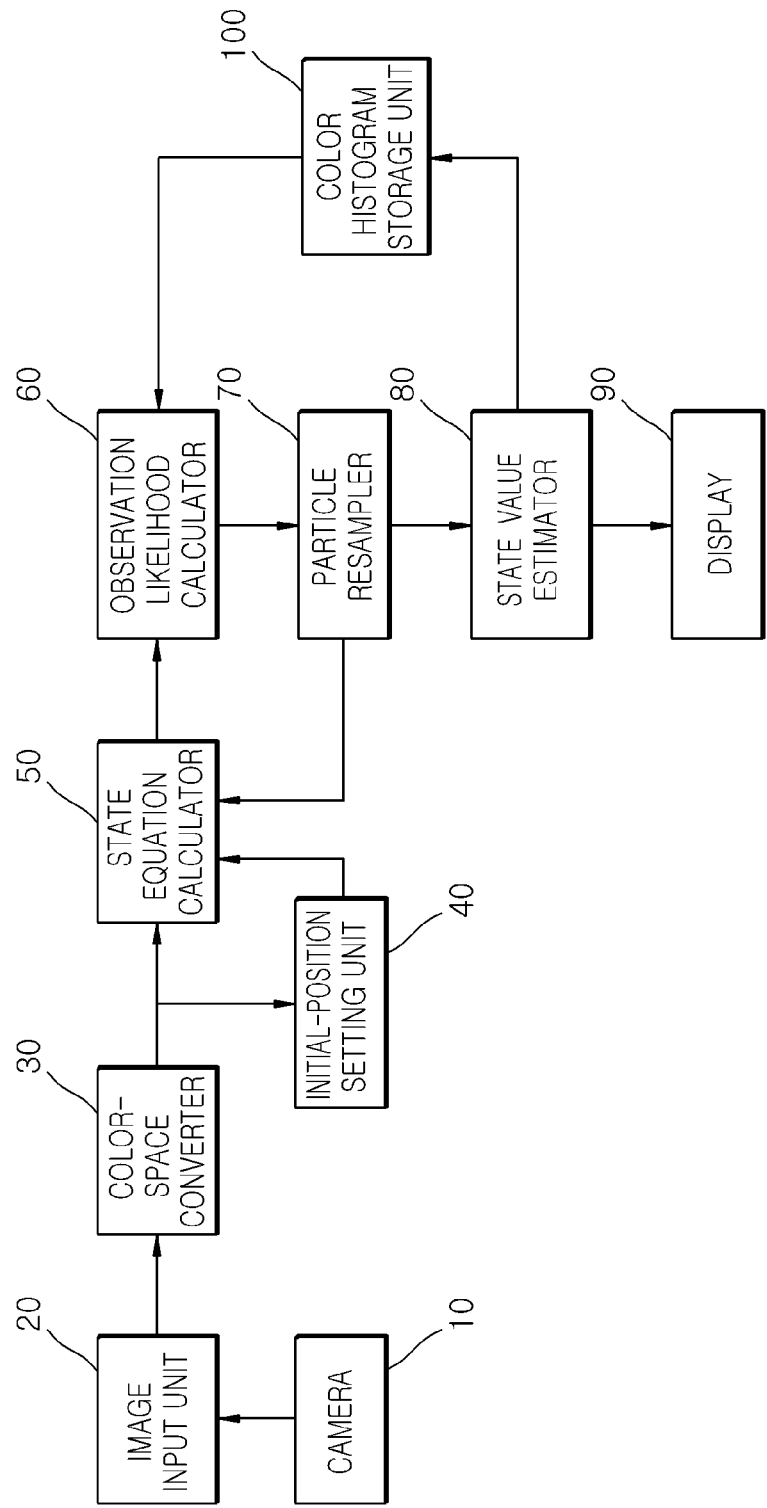
FIG. 1 is a block diagram illustrating a human tracking apparatus using a color histogram according to an embodiment of the present invention.

Reference will now be made in detail to the embodiments of the present invention, examples of which are illustrated in the accompanying drawings. Wherever possible, the same reference numbers will be used throughout the drawings to refer to the same or like parts. A human tracking method using a color histogram according to the present invention will hereinafter be described in detail with reference to the accompanying drawings. In the drawings, line thicknesses or sizes of elements may be exaggerated for clarity and convenience. Also, the following terms are defined considering functions of the present invention, and may be differently defined according to intention of an operator or custom. Therefore, the terms should be defined based on overall contents of the specification.

Figure 2:
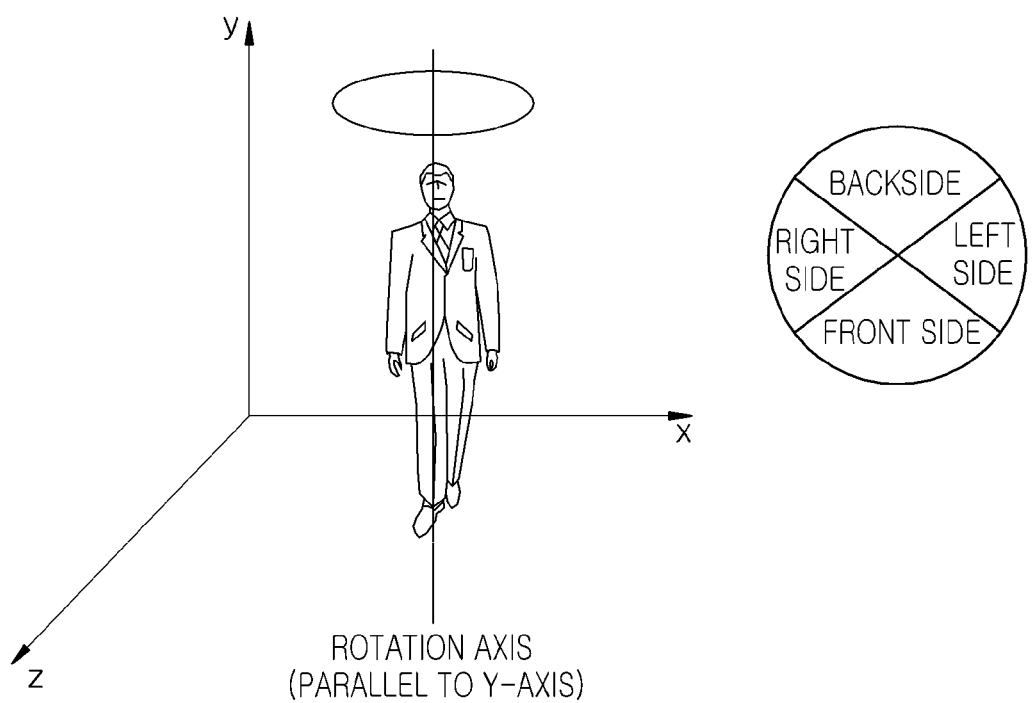
FIG. 2 is a conceptual diagram illustrating human pose variation according to an embodiment of the present invention.

FIG. 1 is a block diagram illustrating a human tracking apparatus using a color histogram according to an embodiment of the present invention. FIG. 2 is a conceptual diagram illustrating human pose variation according to an embodiment of the present invention.

Referring to FIGS. 1 and 2, the human tracking apparatus using the color histogram according to one embodiment of the present invention includes an image input unit 20, a color-space converter 30, an initial-position setting unit 40, a state equation calculator 50, an observation likelihood calculator 60, a particle resampler 70, a state value estimator 80, and a color histogram storage unit 100.

The image input unit 20 sequentially receives video signals captured by a camera 10, and digitizes the received video signals, such that it generates/receives image information.

In this case, the camera 10 may be implemented as any image capturing unit capable of capturing color images, and may include a closed circuit television (CCTV).

The color-space converter 30 converts RGB video signals received from the image input unit 10 into HSV (Hue, Saturation, Value)-based video signals, such that it converts a color space.

The HSV-based image uses a color model comprised of a combination of hue (H), saturation (S), and value (V). The H signal indicates the same color as a color viewed by human eyes. The S signal indicates the definition degree of saturation, and the V signal indicates brightness (or value) of each color.

The reason why the RGB input is converted into an HSV-based color space is that the HSV-based color space can more stably react to illumination variation than the RGB-based color space such that tracking performance is improved.

The initial-position setting unit 40 can establish the initial position of a target person to be tracked from the HSV-based video signal using human detection data of the object detection module.

The state equation calculator 50 calculates a state equation using particles' state of the previous frame, state transition matrix, and particles' kinetic model.

In this case, state variable for use in the state equation must include the position of a person and a rotation angle of the person on the condition that an Y-axis corresponding to an upright state of the person shown in FIG. 2 is used as a rotation axis.

That is, the human pose is exemplarily classified into four poses (i.e., a front pose, a backside pose, a left-side pose, and a right-side pose) as shown in FIG. 2. If necessary, the number of human poses may be increased.

However, movement speed, height, etc. of the human need not always be included in the state variable.

In addition, a variety of models may be used as a kinetic model of the particle, for example, Gaussian model, random walk model, etc.

The observation likelihood calculator 60 calculates observation likelihood for each particle using different target color histograms according to per-particle pose information calculated by the state equation calculator 50.

The particle resampler 70 resamples high-likelihood particles on the basis of the observation likelihood calculated by the observation likelihood calculator 60. In this case, there is a high probability that a state value of the high-likelihood particle approximates a true value.

The resampled particle state is re-input to the state equation calculator 50.

The state value estimator 80 calculates a state estimation value of the person located in a current frame using a mean value of the particles resampled by the particle resampler 70.

The tracking window determined through the calculated personal state estimation value can display the human tracking state on an image displayed on the display 90.

In addition, a target color histogram is updated and stored in the color histogram storage unit 100, such that the observation likelihood calculator 60 can calculate adaptive observation likelihood for each pose.

In this case, update of the target color histogram can be represented by Equation 1.

$$q_t^m = (1-\alpha)q_{t-1}^m + \alpha p_{E[X_t]}$$ [Equation 1]

In Equation 1, $q_t^m$ is an m-th target color histogram, $p_{E[X_t]}$ is a color histogram of a mean value of particles at a $t^{th}$ frame, and $\alpha$ is a weight of 0~1.

Figure 3:
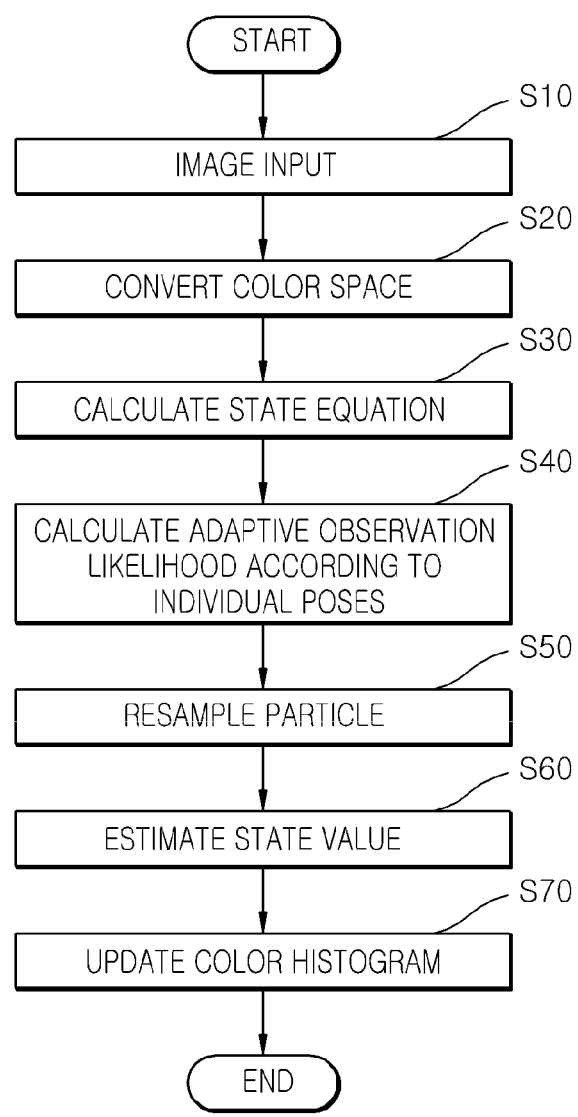
FIG. 3 is a flowchart illustrating a human tracking method using a color histogram according to an embodiment of the present invention.

FIG. 3 is a flowchart illustrating a human tracking method using a color histogram according to an embodiment of the present invention.

Referring to FIG. 3, the human tracking method using the color histogram according to one embodiment of the present invention receives a video signal from the camera 10, such as a CCTV, capable of capturing a color image (Step S10).

The human tracking method using the color histogram converts an RGB-based video signal into the HSV color space, such that it can more stably perform human tracking in response to illumination conversion (Step S20).

Thereafter, in the case of the initial frame for tracking the human in an input video signal, the human tracking method may establish the initial position of a target person to be tracked from the HSV-based video signal using human detection data.

The human tracking method calculates a state equation for particles on the basis of HSV-based video data obtained by color space conversion (Step S30).

The human tracking method calculates a state equation using a particle state, state transition matrix, and particle's kinetic model that are requisite for a previous frame at every frame.

In this case, the state variable for use in the state equation must include the position of a person and a rotation angle of the person on the condition that an upright state of the person is used as a rotation axis as shown in FIG. 2. In this case, the rotation angle of the person may be obtained when the person moves to the front, the backside, the left-side direction, and the right-side direction using the upright state of the person as a rotation axis. As a kinetic model of the particle, a Gaussian model, random walk model, etc. may be used.

In this case, the state variables must include the rotation angle of the person. As shown in FIG. 2, the human pose is exemplarily classified into four poses (i.e., a front pose, a backside pose, a left-side pose, and a right-side pose) according to individual rotation angles. If necessary, the number of human poses may be increased to 4 or higher.

After calculating the state equation, the human tracking method calculates observation likelihood for each frame using different target color histograms according to the calculated pose information for each particle (Step S40).

Thereafter, the human tracking method resamples a high-likelihood particles on the basis of the observation likelihood (Step S50). In this case, there is a high probability that a state value of the high-likelihood particle approximates a true value.

The human tracking method calculates a state estimation value of the person by calculating a mean value of the resampled particles (Step S60).

In addition, a target color histogram is updated and stored in the color histogram storage unit 100, such that the observation likelihood calculator 60 can calculate adaptive observation likelihood for each pose (Step S70).

In this case, update of the target color histogram may be represented by Equation 1.

By repeating the above-mentioned steps at each frame, the human tracking method according to the present invention adaptively uses different target color histograms according to individual poses of the human, such that it can stably provide improved tracking performance although the human pose is changed.

As described above, there is a high probability that different color distributions are obtained according to individual human poses (for example, the human moves to the front, backside, left-side direction, and right-side direction) and clothings, skin color of each human. Accordingly, the human tracking method using the color histogram according to the present invention can more adaptively perform human tracking using different target color histograms according to the human poses, instead of applying only one target color histogram to the tracking process of one person, such that the accuracy of human tracking can be increased.

As is apparent from the above description, the human tracking method based on the color histogram according to the present invention adaptively uses different target color histograms according to individual poses (i.e., front pose, backside pose, left-side pose, and right-side pose) of a human being when tracking the human being on the basis of a particle filter, such that it can track the human being successfully. As a result, the human tracking method can stably provide improved tracking performance or throughput irrespective of the changing pose of the human being.

While the present invention has been described with respect to the specific embodiments, it will be apparent to those skilled in the art that various changes and modifications may be made without departing from the spirit and scope of the invention as defined in the following claims.

What is claimed is:

1. A human tracking method using a color histogram comprising:
   creating color-space conversion data by performing color space conversion of input video data;
   calculating a state equation for each of a plurality of particles based on the color-space conversion data, the state equation including a state variable representing a human pose that comprises a position of a human and a rotation angle of the human;
   calculating, for each particle, a human pose-adaptive observation likelihood by using target color histograms corresponding to calculated pose information;
   resampling the particles based on the observation likelihood, and estimating a state value of the human; and
   updating the target color histograms.

2. The method according to claim 1, wherein the rotation angle is around a rotation axis perpendicular to the ground.

3. The method according to claim 1, wherein estimating the state value of the human includes calculating the state value using a mean value of the resampled particles.

4. A human tracking apparatus using a color histogram comprising:
   an image input unit configured to receive input video data;
   a color space converter configured to create color space conversion data by performing color space conversion of the input video data;
   a state equation calculator configured to calculate a state equation for each of a plurality of particles based on the color-space conversion data, the state equation including a state variable representing a human pose that comprises a position of a human and a rotation angle of the human;
   an observation likelihood calculator configured to calculate, for each particle, a human pose-adaptive observation likelihood using target color histograms corresponding to calculated pose information;

a particle resampler configured to resample the particles based on the observation likelihood; and a state value estimator configured to estimate a state value of the human based on the resampled particles.

5. The apparatus according to claim 4, wherein the rotation angle is around a rotation axis perpendicular to the ground.

6. The apparatus according to claim 4, wherein the state value estimator uses a mean value of the resampled particles to estimate the state value of the human.

\* \* \* \* \*